(12) United States Patent
Scheim et al.

(10) Patent No.: US 9,637,600 B2
(45) Date of Patent: May 2, 2017

(54) CROSS-LINKABLE MASSES BASED ON ORGANOSILICON COMPOUNDS

(75) Inventors: Uwe Scheim, Coswig (DE); Detlev Ostendorf, Dresden (DE)

(73) Assignee: Wacker Chemie AG, Munich (DE)

( * ) Notice: Subject to any disclaimer, the term of this patent is extended or adjusted under 35 U.S.C. 154(b) by 1267 days.

(21) Appl. No.: 13/130,672

(22) PCT Filed: Dec. 15, 2009

(86) PCT No.: PCT/EP2009/067152
§ 371 (c)(1),
(2), (4) Date: May 23, 2011

(87) PCT Pub. No.: WO2010/072615
PCT Pub. Date: Jul. 1, 2010

(65) Prior Publication Data
US 2011/0245377 A1  Oct. 6, 2011

(30) Foreign Application Priority Data
Dec. 23, 2008 (DE) .......... 10 2008 055 146

(51) Int. Cl.
*C08G 77/26* (2006.01)
*C08G 77/16* (2006.01)
*C08L 83/04* (2006.01)
*C08K 5/544* (2006.01)
*C08K 5/548* (2006.01)
*C08K 5/5455* (2006.01)

(52) U.S. Cl.
CPC .............. *C08G 77/26* (2013.01); *C08L 83/04* (2013.01); *C08G 77/16* (2013.01); *C08K 5/548* (2013.01); *C08K 5/5442* (2013.01); *C08K 5/5455* (2013.01)

(58) Field of Classification Search
USPC ....... 528/32, 34, 40; 525/477; 524/425, 322; 523/200
See application file for complete search history.

(56) References Cited

U.S. PATENT DOCUMENTS 5,093,454 A * 3/1992 Fujimoto et al. ............... 528/34
6,001,948 A * 12/1999 Scheim et al. .................. 528/34

FOREIGN PATENT DOCUMENTS

DE        19725501 C1    12/1998
DE     102007037196 A1 *  8/2008

* cited by examiner

*Primary Examiner* — Randy Gulakowski
*Assistant Examiner* — Ha S Nguyen
(74) *Attorney, Agent, or Firm* — Brooks Kushman P.C.

(57) ABSTRACT

Curable organosilicon compositions with good adhesion to substrates and good workability contain a condensable base organopolysiloxane, a carbamato-alkyl-functional alkoxysilane, and a heterocycle substituted at a heteroatom by an alkoxysilylmethyl group.

21 Claims, No Drawings

CROSS-LINKABLE MASSES BASED ON ORGANOSILICON COMPOUNDS

CROSS-REFERENCE TO RELATED APPLICATION

This application is the U.S. national phase of PCT Appln. No. PCT/EP2009/067152 filed Dec. 15, 2009 which claims priority to German application DE 10 2008 055 146.5 filed Dec. 23, 2008.

BACKGROUND OF THE INVENTION

1. Field of the Invention

The invention relates to crosslinkable compositions on organosilicon compounds which comprise heterocyclic substituents, to processes for preparing them, and to their use.

2. Description of the Related Art

One-component sealants which are storable with exclusion of water and which vulcanize to elastomers at room temperature on ingress of water (RTV-1 compositions) have been known for a long time. These products are used in large quantities in the construction industry, for example. The basis of these mixtures are polymers terminated by silyl groups which carry reactive substituents such as OH groups or hydrolyzable groups such as alkoxy groups, for example. Of importance for professional applications in particular are neutrally crosslinking sealants which comprise large amounts of fillers, since compositions of this kind have particularly good processing properties. Of interest for this purpose are, in particular, what are called alkoxy-crosslinking sealants, since in the course of the curing they do not give off elimination products that are objectionable from a health standpoint.

These sealants are typically subjected to particularly exacting requirements in terms of their adhesion to a multiplicity of different substrates. This function is commonly resolved by adding organofunctional silanes as adhesion promoters. Reference may be made here, in particular, to U.S. Pat. No. 5,093,454, which describes an adhesion promoter combination of silyl-substituted isocyanurates and epoxy-functional silanes. The compositions described therein using alkoxy-functional silanes are not stable on storage, however, but instead cure fully within a short time when the polymer components are mixed with the crosslinkers. Such compositions are of no interest for construction applications.

In addition to good substrate adhesion, sealants for construction applications are required to exhibit a low 100% tensile strain, usually termed "modulus". The 100% tensile strain for such low-modulus sealants must in general be less than 0.4 MPa. Furthermore, it is absolutely necessary for the products to possess very good storage stability, so that they still possess flawless functioning even at the end of their guaranteed storage life. Good processing properties, in addition, require that the composition be modelable, something which is typically achieved by adding a large amount of fillers.

SUMMARY OF THE INVENTION

The invention provides compositions which are crosslinkable by condensation reaction and are preparable using (A) organosilicon compounds having at least two condensable groups, (B) organosilicon compounds of the formula $$(R^3O)_{3-n}SiR^2_n-(CR^1_2)_m-NR^7-CO-R^8 \qquad (I),$$

where $R^1$ may be identical or different and denotes hydrogen or a monovalent, optionally substituted hydrocarbon radical, $R^2$ may be identical or different and denotes monovalent, optionally substituted hydrocarbon radicals which may be interrupted by oxygen atoms, $R^3$ may be identical or different and denotes hydrogen atom or monovalent, optionally substituted hydrocarbon radicals which may be interrupted by oxygen atoms, $R^7$ denotes hydrogen or a monovalent, optionally substituted hydrocarbon radical which may be attached to the nitrogen atom via a carbonyl group, or is part of a bridging organic radical, $R^8$ denotes a monovalent, optionally substituted hydrocarbon radical or is part of a bridging organic radical, and $R^7$ and $R^8$ may form a ring with one another, m is an integer from 1 to 8, more preferably 1 or 3, and n is 0, 1 or 2, preferably 0 or 1, more preferably 0, and/or the partial hydrolysates thereof, (C) heterocyclic compounds of the formula $$A[CR^4_2SiR^5_a(OR^6)_{3-a}]_x \qquad (V)$$

where

A is a radical which is based on a heterocycle $AH_x$ and comprises at least one ring-forming element from main group 3 and/or 5, and in which x hydrogen atoms are replaced by chemical bonds to the $CR^4_2$ radical, at least one of these bonds being located on a ring-forming element of main group 3 or 5, $R^4$ may be identical or different and denotes hydrogen or a monovalent, optionally substituted hydrocarbon radical, $R^5$ may be identical or different and denotes monovalent, optionally substituted hydrocarbon radicals which may be interrupted by oxygen atoms, $R^6$ may be identical or different and denotes hydrogen and monovalent, optionally substituted hydrocarbon radicals which may be interrupted by oxygen atoms, a is 0 or 1, preferably 0, and x is 1, 2 or 3, preferably 1 or 2, more preferably 1, and/or the partial hydrolysates thereof, with the proviso that radical A does not comprise a ring carbon atom that has oxygen or sulfur atoms attached by a double bond and that has direct bonding to a ring-forming heteroatom of main group 3 or 5 which is bonded to a $CR^4_2$ radical of the formula (V), optionally (D) epoxy-functional organosilicon compounds, and optionally (E) calcium carbonate coated with stearic acid.

DETAILED DESCRIPTION OF THE PREFERRED EMBODIMENTS

The term "partial hydrolysates" refers for the purposes of the invention to products which have come about through hydrolysis and/or condensation.

The organosilicon compounds (A) used in accordance with the invention may be any organosilicon compounds having at least two condensable groups that in compositions crosslinkable by condensation reaction.

The organosilicon compounds (A) used in accordance with the invention are preferably compounds comprising units of the formula $$R_b(OH)_cSiO_{(4-b-c)/2} \qquad (VI)$$

where

R may be identical or different and denotes optionally substituted hydrocarbon radicals which may be interrupted by oxygen atoms, b is 0, 1, 2 or 3, preferably 2, and c is 0, 1, 2 or 3, preferably 0 or 1, with the proviso that the sum of b+c≤3 and that per molecule there are at least two condensable radicals OH present.

Radical R preferably comprises monovalent hydrocarbon radicals having 1 to 18 carbon atoms which are optionally substituted by halogen atoms, amino groups, ether groups, ester groups, epoxy groups, mercapto groups, cyano groups or (poly)glycol radicals, the latter being constructed of oxyethylene and/or oxy-propylene units, and more preferably comprises alkyl radicals having 1 to 12 carbon atoms, more particularly the methyl radical.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals, such as n-octadecyl radical; cycloalkyl radicals such as the cyclopentyl, cyclohexyl, cycloheptyl and methylcyclohexyl radicals; alkenyl radicals such as the vinyl, 1-propenyl, and the 2-propenyl radicals; aryl radicals such as the phenyl, naphthyl, anthryl, and phenanthryl radicals; alkaryl radicals such as the o-, m-, and p-tolyl radicals, xylyl radicals and ethylphenyl radicals; and aralkyl radicals such as the benzyl radical and the α- and the β-phenylethyl radicals.

Examples of substituted radicals R are haloalkyl radicals such as the 3,3,3-trifluoroprop-1-yl radical, the 1,1,1,3,3,3-hexafluoroprop-2-yl radical, and the heptafluoroprop-2-yl radical; haloaryl radicals such as the o-, m-, and p-chlorophenyl radical; and the 2-methoxyethyl radical, the 2-methoxyprop-1-yl radical, and the 2-(2-methoxyethoxy) ethyl radical.

Examples of organosilicon compounds (A) are those of the formula $(HO)Me_2SiO[SiMe_2O]_{30-2000}SiMe_2(OH)$ with Me as methyl radical.

The organosilicon compounds (A) used in accordance with the invention are more preferably substantially linear, OH-terminated organopolysiloxanes, more preferably α,ω-dihydroxypolydiorganosiloxanes, and most preferably α,ω-dihydroxypolydimethylsiloxanes. In the aforementioned linear siloxanes it is possible as a result of their preparation for up to 0.1% of all the units to have branches, such as in $MeSiO_{3/2}$ or $SiO_{4/2}$ units, for instance.

The organosilicon compounds (A) used in accordance with the invention preferably have a viscosity of 100 to $10^6$ mPas, more preferably $10^3$ to 350,000 mPas, in each case at 25° C.

The organosilicon compounds (A) are commercially customary products and/or can be prepared by methods commonplace in silicon chemistry.

Examples of optionally substituted hydrocarbon radicals $R^1$ are the radicals indicated above for R. Radical $R^1$ is preferably hydrogen or an alkyl radical, more preferably hydrogen. Examples of radicals $R^2$ are the radicals indicated above for R. Radical $R^2$ preferably comprises monovalent hydrocarbon radicals having 1 to 18 carbon atoms that are optionally substituted by halogen atoms, amino groups, ether groups, ester groups, epoxy groups, mercapto groups, cyano groups or (poly)glycol radicals, the latter being constructed of oxyethylene and/or oxypropylene units, and more preferably comprise alkyl radicals having 1 to 12 carbon atoms, more particularly the methyl radical.

Examples of optionally substituted hydrocarbon radicals $R^3$ are the radicals indicated above for R. Radical $R^3$ preferably comprises alkyl radicals having 1 to 6 carbon atoms, more preferably the methyl and ethyl radical.

Examples of optionally substituted hydrocarbon radicals $R^7$ are the radicals indicated above for R; radicals based on compounds of the formula (I) in which $R^8$ has been replaced by a chemical bond; divalent, optionally substituted hydrocarbon radicals, such as n-propylene and n-butylene radicals for example, and also divalent radicals based on compounds of the formula (I) and their dimers or polymers, in which one $R^7$ and one $R^8$ have each been replaced by chemical bonds.

Radical $R^7$ is preferably hydrogen or a monovalent, optionally substituted hydrocarbon radical, which may be attached to the nitrogen atom via a carbonyl group, or divalent radicals derived from compounds of the formula (I), so that in formula (I) the nitrogen atom forms a ring with the carbonyl carbon atom via this divalent radical. Radical $R^7$ more preferably comprises divalent radicals derived from compounds of the formula (I), so that in formula (I) the nitrogen atom forms a ring with the carbonyl carbon atom via this divalent radical.

Examples of radicals $R^8$ are the radicals indicated above for $R^7$. Radical $R^8$ preferably comprises monovalent, optionally substituted hydrocarbon radicals or divalent radicals derived from compounds of the formula (I), so that in formula (I) the carbonyl carbon atom forms a ring with the nitrogen atom via this divalent radical. $R^8$ more preferably comprises divalent radicals derived from compounds of the formula (I), so that in formula (I) the carbonyl carbon atom forms a ring with the nitrogen atom via this divalent radical.

The radicals $R^7$ and $R^8$ more preferably are a divalent radical which joins the nitrogen atom and the carbonyl carbon atom in formula (I) to form a ring. The radical in question is more particularly a divalent radical of the formula

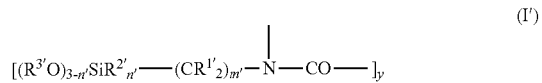

(I')

where $R^{1'}$ has a definition indicated for $R^1$, $R^{2'}$ has a definition indicated for $R^2$, $R^{3'}$ has a definition indicated for $R^3$, m' has a definition indicated for m, and n' has a definition indicated for n, and also y is an integer, preferably 1 or 2, more preferably 2.

Examples of organosilicon compounds (B) used in accordance with the invention are N-1-(triethoxysilyl)-ethylpyrrolid-2-one, N-1-(triethoxysilyl)ethyl-N-methylacetamide, N-1-(triethoxysilyl)ethylsuccinimide, N-1-(triethoxysilyl) ethylphthalimide, N,N'-bis(3-(trimethoxysilyl)propyl)uretdione, 1,3,5-tris(3-tri-methoxysilylpropyl)isocyanurate, 1,3, 5-tris(3-(tri-ethoxysilylpropyl)isocyanurate, N,N',N'''-tris(3-(tri-methoxysilyl)propyl)-2-imino-3H,5H-1,3,5-oxadiazine-4,6-dione, 1,3,5-tris[3-(trimethoxysilyl)propyl]-1H,3H,5H-1,3,5-triazine-2,4,6-trione, 1,3,5-tris[3-(triethoxysilyl) propyl]-1H,3H,5H-1,3,5-triazine-2,4,6-trione, 1,3,5-tris [trimethoxysilylmethyl]-1H,3H,5H-1,3,5-triazine-2,4,6-trione, 1,3,5-tris-[triethoxysilylmethyl]-1H,3H,5H-1,3,5-triazine-2,4,6-trione, 1,3,5-tris[3-(dimethoxymethylsilyl) propyl]-1H,3H,5H-1,3,5-triazine-2,4,6-trione, 1,3,5-tris[3-(diethoxymethylsilyl)propyl]-1H,3H,5H-1,3,5-triazine-2,4, 6-trione, 1,3,5-tris[dimethoxymethylsilylmethyl]-1H,3H, 5H-1,3,5-triazine-2,4,6-trione, 1,3,5-tris[diethoxymethylsilylmethyl]-1H,3H,5H-1,3,5-triazine-2,4,6-trione, and also the dimerization and/or trimerization products of silyl-substituted isocyanates with uretdione, isocyanurate, and iminooxadiazine structures and/or the partial hydrolysates thereof.

Further examples of organosilicon compounds (B) are all of the abovementioned compounds in which triethoxysilyl radicals or trimethoxysilyl radicals have been replaced by diethoxymethoxysilyl radicals or ethoxydimethoxysilyl radicals, and also in which the diethoxymethylsilyl radical or dimethoxymethylsilyl radical have been replaced by ethoxymethoxymethylsilyl radical.

Component (B) used in accordance with the invention preferably comprises dimerization and/or trimerization products of silyl-substituted isocyanates with uretdione, isocyanurate and iminooxadiazine structures, more particularly of trimethoxysilylpropyl isocyanate, and/or the partial hydrolysates thereof.

The organosilicon compounds (B) used in accordance with the invention are more preferably silyl-substituted isocyanurates of the general formula

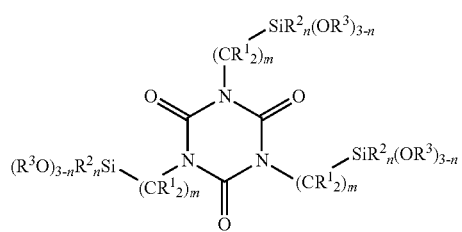

and/or the partial hydrolysates thereof, where $R^1$, $R^2$, $R^3$, n and m may each be identical or different, and have one of the definitions stated above, more particularly 1,3,5-tris[3-(tri-methoxysilyl)propyl]-1H,3H,5H-1,3,5-triazine-2,4,6-trione, 1,3,5-tris(3-trimethoxysilyl-propyl)isocyanur-ate, 1,3,5-tris(3-triethoxysilylpropyl)isocyanurate, and 1,3,5-tris[3-(triethoxysilyl)propyl]1H,3H,5H-1,3,5-triazine-2,4,6-trione.

The partial hydrolysates of the compounds of the formula (I) may be either partial homohydrolysates or partial cohydrolysates. If component (B) used in accordance with the invention comprises partial hydro-lysates of compounds of the formula (I), which is not preferred but which is hard to avoid in practice, preference is given to those having up to 5 Si—O—Si bonds.

Components (B) are commercially available products and/or can be prepared by methods commonplace in chemistry, such as, preferably, by reaction of silyl-substituted halohydrocarbons with inorganic cyanates, such as 3-chloropropyltrimethoxysilane with potassium cyanate.

The compositions of the invention comprise component (B) in amounts of preferably from 0.05 to 2 parts by weight, more preferably 0.1 to 1.5 parts by weight, and most preferably 0.5 to 1.2 parts by weight, in each case based on 100 parts by weight of the crosslinkable composition.

Examples of optionally substituted hydrocarbon radicals $R^4$ are the radicals indicated above for R. Radical $R^4$ preferably comprises hydrogen atom or hydrocarbon radicals having 1 to 20 carbon atoms, more preferably, hydrogen.

Examples of radicals $R^5$ are the radicals indicated above for R. Radical $R^5$ preferably comprises monovalent hydrocarbon radicals having 1 to 18 carbon atoms that are optionally substituted by halogen atoms, amino groups, ether groups, ester groups, epoxy groups, mercapto groups, cyano groups or (poly)glycol radicals, the latter being constructed of oxyethylene and/or oxypropylene units, and more preferably comprise alkyl radicals having 1 to 12 carbon atoms, more particularly the methyl radical.

Examples of optionally substituted hydrocarbon radicals $R^6$ are the radicals indicated above for $R^3$. Radical $R^6$ preferably comprises alkyl radicals having 1 to 6 carbon atoms, more preferably the methyl and ethyl radical, more particularly the ethyl radical.

Radical A comprises cyclic compounds having ring-forming atoms of at least two different elements, with the proviso that at least one ring-forming atom is an element from main group 3 and/or 5 which has a bonding site to the carbon atom of the radical —$CR^4_2$— in formula (V), and that radical A does not contain any ring carbon atom that has oxygen or sulfur atoms attached via a double bond and that has direct bonding to a ring-forming heteroatom of main group 3 or 5 which is attached to a $CR^4_2$ radical of the formula (V).

Radical A preferably comprises cyclic organic compounds whose ring structures contain not only carbon atoms but also at least one element of main group 3 and/or 5, and more preferably at least one further heteroatom.

In the text below, the term "heteroatoms" is intended to denote all ring-forming atoms other than carbon.

Radical A preferably comprises 6-membered heterocycles which as ring-forming atoms have not only carbon but also nitrogen and/or oxygen and/or sulfur as heteroatoms, with the proviso that at least one ring-forming atom is nitrogen, it also being possible for further rings to be fused thereon.

Examples of heterocycles on which the radicals A are based are pyrrolidine, tetrahydro-1,4-oxazine of the formula

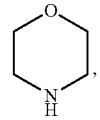, tetrahydro-1,4-thiazine, tetrahydro-1,4-diazine, and 1-methyltetrahydro-1,4-diazine, more particularly tetra-hydro-1,4-oxazine.

The partial hydrolysates of the compounds of the formula (V) may be either partial homohydrolysates or partial cohydrolysates. If the component (C) used in accordance with the invention comprises partial hydrolysates of compounds of the formula (V), which is not preferred but is difficult to avoid in practice, preference is given to those having up to 10 Si—O—Si bonds.

Examples of heterocyclic compounds (C) are 1-(triethoxysilylmethyl)pyrrolidine, 1-(triethoxysilyl-methyl)piperidine, 4-(triethoxysilylmethyl)tetrahydro-1,4-oxazine, 1-(triethoxysilylmethyl)tetrahydro-1,4-diazine-3-one, 1-(trimethoxysilylmethyl)pyrrolidine, 1-(trimethoxysilylmethyl)piperidine, 4-(trimethoxysilyl-methyl)tetrahydro-1,4-oxazine, 1-(diethoxymethylsilyl-methyl)pyrrolidine, 1-(diethoxymethylsilylmethyl)-piperidine, 4-(diethoxymethylsilylmethyl)tetrahydro-1,4-oxazine, 1-(diethoxymethylsilylmethyl)pyrrolidine, 1-(dimethoxymethylsilylmethyl)piperidine, and 4-(dimethoxymethylsilyl-methyl)tetrahydro-1,4-oxazine.

Further examples are all of the above-mentioned compounds in which the triethoxysilyl radical or tri-methoxysilyl radical has been replaced by diethoxy-methoxysilyl radical or ethoxydimethoxysilyl radical, and also the diethoxymethylsilyl radical or dimethoxy-methylsilyl radical has been replaced by ethoxymethoxy-methylsilyl radical.

Component (C) used in accordance with the invention is preferably 4-(triethoxysilylmethyl)tetrahydro-1,4-oxazine.

The heterocyclic compounds (C) used in accordance with the invention are commercially available compounds and/or can be prepared by methods commonplace in chemistry.

The compositions of the invention comprise component (C) in amounts of preferably 0.5 to 10.0 parts by weight, more preferably of 0.5 to 2.0 parts by weight, based in each case on 100 parts by weight of the crosslinkable composition.

The epoxy-functional compounds (D) optionally used are preferably compounds of the formulae

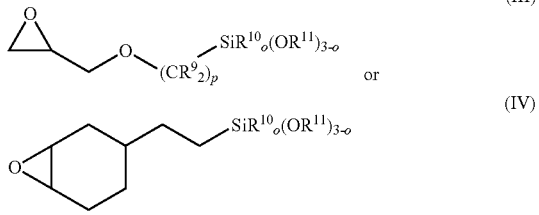

where o may be identical or different and is 0, 1 or 2, preferably 0 or 1, more preferably 0, p is an integer from 1 to 8, more preferably 1 or 3, $R^9$ may be identical or different and denotes hydrogen atom or monovalent, optionally substituted hydrocarbon radicals, $R^{10}$ may be identical or different and denotes monovalent, optionally substituted hydrocarbon radicals which may be interrupted by oxygen atoms, and $R^{11}$ may be identical or different and denotes hydrogen atom or monovalent, optionally substituted hydrocarbon radicals which may be interrupted by oxygen atoms.

Examples and preferred ranges for radical $R^9$ are those indicated for radical $R^1$.

Examples and preferred ranges for radical $R^{10}$ are those indicated for radical $R^2$.

Examples and preferred ranges for radical $R^{11}$ are those indicated for radical $R^3$.

Examples of component (D) of the formula (III) are 3-glycidyloxypropyltrimethoxysilane, 3-glycidyloxypropyltriethoxysilane, 3-glycidyloxypropyldimethoxymethyl-silane, and 3-glycidyloxypropyldiethoxymethylsilane, with 3-glycidyloxypropyltrimethoxysilane and 3-glycidyloxypropyltriethoxysilane being preferred.

Preferred for component (D) of the formula (IV) is 2-(3,4-epoxycyclohexyl)ethyltriethoxysilane.

The optionally used component (D) preferably comprises compounds of the formula (III), more particularly 3-glycidyloxypropyltriethoxysilane and 3-glycidyloxy-propyltrimethoxysilane.

Component (D) comprises commercially available products and/or can be prepared in accordance with methods that are commonplace in silicon chemistry.

If the compositions of the invention comprise component (D), the amounts are from preferably 0.05 to 2 parts by weight, more preferably from 0.1 to 1.5 parts by weight, and most preferably from 0.5 to 1.5 parts by weight, in each case based on 100 parts by weight of the crosslinkable composition. The compositions of the invention preferably comprise component (D).

The calcium carbonate on which optionally used component (E) is based is preferably ground calcium carbonate, more preferably ground calcium carbonate from natural sources, such as limestone and marble. In all cases, the calcium carbonate is treated by known methods with stearic acid, preferably in amounts of 0.1% to 4.0% by weight, based on the amount of the calcium carbonate to be treated. The stearic acid originates preferably from natural sources and typically comprises, in addition to the stearic acid, other long-chain carboxylic acids having 14 to 22 carbon atoms.

The component (E) used optionally in the composition of the invention preferably has an average particle size (D50) of 0.1 to 10 µm, more preferably 1 to 6 µm. Component (E) preferably has a stearic acid fraction of 0.5% to 1.0% by weight, more preferably of 0.7% to 0.9% by weight, and most preferably approximately 0.8% by weight, and has a moisture content, measured by the weight loss on drying at 110° C. under a pressure of 1013 hPa, of preferably less than 0.05% by weight.

Examples of component (E) are the products OMYACARB BLR3, OMYABOND 520-FL, and OMYACARB 5T-NJ available from the company OMYA, D-Cologne, the product with the designation OMYABOND 520-FL being particularly preferred.

If the compositions of the invention comprise component (E), the amounts are from preferably 10 to 60 parts by weight, more preferably from 30 to 55 parts by weight, and most preferably from 40 to 55 parts by weight, in each case based on 100 parts by weight of the crosslinkable composition. The compositions of the invention preferably comprise component (E).

Further to the above-described components (A), (B), (C), optionally (D), and optionally (E), the compositions of the invention may comprise all substances which have also been employed to date in compositions crosslinkable by condensation reaction, for example, (F) further crosslinkers, (G) catalysts, (H) further fillers, (I) further adhesion promoters, (K) plasticizers, and (L) additives.

The further crosslinkers (F) which are optionally used may be any useful crosslinkers that have at least three condensable radicals, for example, silanes having at least three organyloxy groups, different from components (B), (C), and (D). The further crosslinkers (F) are more preferably silane crosslinkers such as tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyltriethoxysilane, cyclohexylaminomethyl-triethoxysilane, N-(trimethoxysilylmethyl)-O-metylcarbamate, N,N-dibutylaminomethyltriethoxysilane, and triethoxysilylmethyl methacrylate, and also the partial hydrolysates thereof.

The further crosslinkers (F) used optionally in the compositions of the invention are commercially available products and/or can be prepared by methods that are known in silicon chemistry.

If the compositions of the invention comprise further crosslinkers (F), the amounts are preferably 0.1 to 10 parts by weight, more preferably 0.1 to 5 parts by weight, and most preferably 0.1 to 3 parts by weight, based on 100 parts by weight of the composition of the invention. The compositions of the invention preferably comprise additional crosslinker (F).

Examples of catalysts (G) are conventional titanium compounds such as tetraisopropoxytitanate, and also zirconium compounds and hafnium compounds; zinc compounds such as zinc 2-ethylhexoate; and organotin compounds such as di-n-butyltin dilaurate, di-n-butyltin diacetate, di-n-butyltin oxide, dioctyltin diacetate, dioctyltin dilaurate, dioctyltin oxide, and also reaction products of these compounds with alkoxysilanes such as tetraethoxysilane, preference being given to solutions of di-n-octyltin oxide in tetraethyl silicate hydrolysate, solutions of di-n-octyltin oxide in a mixture of 50% by weight methyltriethoxysilane hydrolysate and 50% by weight 3-aminopropyltriethoxysilane and solutions of di-n-octyltin oxide in tetraisopropyl silicate, with particular preference being given to reaction products of phosphoric esters and phosphonic acids with di-n-octyltin oxide in tetraethyl silicate hydrolysate, with di-n-octyltin oxide in solution in a mixture of 50% by weight methyltriethoxysilane hydrolysate and 50% by weight 3-aminopropyltriethoxysilane, and with di-n-octyltin oxide in tetraisopropyl silicate.

If the compositions of the invention comprise catalyst (G), the amounts are preferably 0.0001 to 2 parts by weight, more preferably 0.001 to 1 part by weight, in each case based on 100 parts by weight of the composition of the invention. The compositions of the invention preferably comprise catalyst (G).

The further fillers (H) which are optionally used in the compositions of the invention may be any desired fillers which are different from component (E). Examples of further fillers (H) are nonreinforcing fillers, in other words fillers having a BET surface area of up to 50 $m^2/g$ such as quartz, diatomaceous earth, calcium silicate, zirconium silicate, and zeolites; metal oxide powders such as aluminum, titanium, iron or zinc oxides and mixed oxides thereof; barium sulfate, gypsum, silicon nitride, silicon carbide, boron nitride, glass powders and plastics powders such as polyacrylonitrile powders; and reinforcing fillers, in other words fillers having a BET surface area of more than 50 $m^2/g$, such as fumed silica, precipitated silica, carbon black such as furnace black and acetylene black, and silicon-aluminum mixed oxides of high BET surface area; fibrous fillers, such as asbestos, and also plastics fibers. The stated fillers may have been rendered hydrophobic through treatment, for example, with organosilanes and/or organosiloxanes or by etherification of hydroxyl groups to form alkoxy groups. If fillers (H) are used, they are preferably hydrophilic fumed silica.

If the compositions of the invention comprise component (H), the amounts are from preferably 1 to 80 parts by weight, more preferably from 1 to 10 parts by weight, based in each case on 100 parts by weight of composition of the invention. The compositions of the invention preferably comprise component (H).

The further adhesion promoter (I) optionally used in the compositions of the invention may comprise any desired adhesion promoters that are different from component (D). Examples of the further adhesion promoters (I) are silanes and organopolysiloxanes having functional groups such as those having aminopropyl, aminoethylaminepropyl ureidoproyl or methacryloyloxypropyl radicals.

If the compositions of the invention comprise component (I), the amounts are preferably from 0.01 to 2.5 parts by weight, more preferably from 0.1 to 1.0 parts by weight, based in each case on 100 parts by weight of the composition of the invention. The compositions of the invention preferably comprise component (I).

Examples of plasticizers (K) are dimethylpolysiloxanes which are liquid at room temperature and are end blocked by trimethylsiloxy groups, preferably those having viscosities in the range between 5 and 1000 mPas at 25° C., and also high-boiling hydrocarbons such as liquid paraffins or mineral oils composed of naphthenic and paraffinic units.

If the compositions of the invention comprise component (K), the amounts are from preferably 1 to 50 parts by weight, more preferably 5 to 25 parts by weight, based in each case on 100 parts by weight of the composition of the invention. The compositions of the invention preferably comprise component (K).

Examples of additives (L) are pigments, dyes, odorants, oxidation inhibitors, agents for influencing electrical properties such as conductive carbon black, flame retardants, light stabilizers, and agents for prolonging skin-forming time such as silanes with an SiC-bonded mercaptoalkyl radical, cell generators, e.g., azodicarbonamide, heat stabilizers, and thixotropic agents such as polyethers, for example, and organic solvents such as alkylaromatics, biocides such as fungicides, bactericides, and acaricides, and agents for further regulating the modulus such as polydimethylsiloxanes having an OH end group.

If the compositions of the invention comprise component (L), the amounts are from preferably 0.0001 to 10 parts by weight, more preferably from 0.001 to 10 parts by weight, in each case based on 100 parts by weight of the composition of the invention.

With particular preference, the compositions of the invention are compositions crosslinkable through condensation reaction with atmospheric moisture and are preparable using (A) organosilicon compounds having at least two condensable groups, (B) organosilicon compounds of the formula (I) and/or the partial hydrolysates thereof, (C) heterocyclic compounds of the formula (V), and/or the partial hydrolysates thereof, optionally (D) epoxy-functional organosilicon compounds, optionally (E) calcium carbonate coated with stearic acid, optionally (F) further crosslinkers, optionally (G) catalysts, optionally (H) further fillers, optionally (I) further adhesion promoters, optionally (K) plasticizers, and optionally (L) additives.

In particular, for preparing the compositions of the invention, no further constituents are used beyond components (A) to (L).

The individual constituents of the compositions of the invention may in each case be one kind of such a constituent or else a mixture of at least two different kinds of such constituents.

The compositions of the invention may be any desired, existing types of crosslinkable compositions based on organosilicon compounds, such as, for example, one-component or two-component room temperature-vulcanizable organic polysiloxane compositions. With preference the compositions of the invention are crosslinkable one-component compositions.

To provide the compositions of the invention it is possible in principle for all of the constituents to be mixed with one another in any order.

The mixing of the components may take place at room temperature under the pressure of the surrounding atmosphere, in other words about 900 to 1100 hPa, or under a reduced pressure of approximately 20 hPa to 800 hPa. If desired, however, this mixing may also take place at higher temperatures, as for example at temperatures in the range from 35 to 135° C. Heating or cooling may be carried out if desired.

The inventive mixing of the individual components preferably takes place with very substantial exclusion of water from the surrounding atmosphere, and this may be realised, for example, by blanketing with dry air.

In one preferred embodiment of the process of the invention for preparing the crosslinkable compositions of the invention, organosilicon compound (A) is mixed first of all optionally with plasticizer (K) and additives (L), and then components (C) and (B) and also, optionally, components (D), (F), and (I) are added and intimately mixed. If desired, calcium carbonate (E) coated with stearic acid, and further fillers (H), are added thereafter, and the mixture is homogenized; lastly, optionally, catalyst (G) is added.

In another preferred embodiment of the process of the invention, all of the components that are liquid under process conditions, apart from (A) and (G), are first of all mixed with one another, before being added to component (A). For the usually small amounts of catalyst it is advantageous in particular to add said catalyst as a premix in a portion of components (F), (I) or (K).

After all of the desired constituents have been mixed, the mixture is preferably degassed and dispensed into moisture-tight containers.

The inventive preparation of the crosslinkable compositions of the invention may be carried out either continuously or batchwise.

The typical water content of the air is sufficient for the crosslinking of the compositions of the invention.

The compositions of the invention are crosslinked preferably at room temperature. Their crosslinking may also, if desired, be carried out at higher or lower temperatures than room temperature, as for example at −5° to 15° C. or at 30° to 50° C., and/or by means of water concentrations which exceed the normal water content of the air.

The crosslinking is carried out preferably under a pressure of 100 to 1100 hPa, more particularly under the pressure of the surrounding atmosphere.

The present invention further provides shaped articles produced by crosslinking the compositions of the invention.

The compositions of the invention can be used for all applications for which are possible which use compositions which are storable in the absence of water and on ingress of water at room temperature crosslink to elastomers.

The compositions of the invention are therefore outstandingly suitable, for example, as sealants for joints, including vertical joints, and similar cavities with a clear width of 10 to 40 mm, for example, such as in buildings, land-, water-, and air-craft, or as adhesives or putties, such as in window construction or in the production of aquariums or glass cabinets, for example, and also, for example, for producing protective coatings, including those for surfaces exposed to the continual action of fresh or salt water, or slip-preventing coatings, or of rubber-elastic shaped articles, and also for the insulation of electrical or electronic apparatus.

An advantage of the compositions of the invention is that they are stable on storage and of low modulus. A further advantage of the compositions of the invention is that, on account of the very low level of stringing by the uncured compositions, they possess very good processing properties and smoothability. The compositions adhere very well to a large number of substrates, such as concrete, glass, and metals and alloys such as iron, stainless steel, copper, brass, and aluminum, and also to a multiplicity of plastics such as PVC and polycarbonate, and to powder-coated surfaces.

In the examples described below, all viscosity figures are based on a temperature of 25° C. Unless indicated otherwise, the examples below are carried out under the pressure of the surrounding atmosphere, in other words at about 1000 hPa, and at room temperature, in other words at about 23° C., or at a temperature which comes about when the reactants are combined at room temperature without additional heating or cooling, and also at a relative humidity of approximately 50%. Furthermore, all figures of parts and percentages are given by weight unless indicated otherwise.

Shore A hardness is determined in accordance with DIN (German Industry Standard) 53505-87; tensile strength is determined in accordance with DIN 53504-85 S2; elongation at break is determined in accordance with DIN 53504-85 S2; and modulus is the strain at 100% extension.

Example 1

350 g of an α,ω-dihydroxypolydimethylsiloxane having a viscosity of 80,000 mPas, 150 g of an α,ω-trimethylsiloxy-polydimethylsiloxane having a viscosity of 1000 mPas, 13.6 g of 4-(triethoxysilylmethyl)tetrahydro-1,4-oxazine, 20.0 g of vinyltriethoxysilane, 12.0 g of tetraethoxysilane, 4.43 g of 1,3,5-tris(3-trimethoxysilylpropyl)isocyanurate, 4.43 g of a mixture of 1 part by weight of methyltriethoxysilane hydrolysate oligomers having on average 10 Si atoms per molecule and 1 part by weight of 3-aminopropyltriethoxysilane, and 4.43 g of 3-glycidyloxypropyltrimethoxysilane were mixed intimately with one another in a planetary dissolver for 15 minutes. Thereafter 45.0 g of hydrophilic fumed silica having a BET surface area of 150 $m^2/g$ were added (available commercially under the name HDK® V15 from Wacker Chemie AG. D-Munich) and mixing was continued for 15 minutes. The mixture was subsequently completed by addition of a mixture of 0.36 g of zinc bis(2-ethylhexanoate) and 0.24 g of bis(2-ethylhexanote-O-μ-oxodizinc. For the degassing of the mixture, a subatmospheric pressure of approximately 200 hPa was applied and mixing was continued for 5 minutes. Thereafter the completed mixture was dispensed into standard commercial polyethylene cartridges. A composition was obtained which in accordance with ISO 7390 was sag-resistant—this means that the composition did not run from a vertically suspended, U-shaped aluminum profile.

Samples of the resulting product were stored first in cartridges with airtight and moisturetight sealing at 23° C. for 24 hours prior to the assessment of the properties. Of these samples, one sample was subsequently stored in the airtight and moisturetight cartridge at 70° C. for a further 7 days. Sheets 2 mm thick of each of these thus-pretreated mixtures were cast onto polyethylene films, and after curing for one day were detached from the film and suspended in such a way that air was able to enter from all sides for a further 6 days, meaning that the samples were cured over a total of 7 days. The relative humidity during this time was set at 50%, the temperature being regulated at 23° C. Test specimens in the S2 form in accordance with DIN 53504-85 were subsequently punched from these sheets, and the mechanical characteristics were measured. For determination of the hardness, specimens 6 mm thick were produced and were cured likewise over 7 days at a relative humidity of 50% and at a temperature of 23° C. by reaction with the surrounding atmospheric moisture.

In addition, the skin-forming time and the tack-free time of the surface were ascertained, in each case, again, at 50% relative humidity and 23° C. The skin-forming time is determined by gently contacting the surface of a freshly poured composition with the point of a pencil at intervals of 3 minutes. The skin-forming time is reached when composition no longer remains hanging from the point of the pencil. Freedom from tack is ascertained by touch with the fingers at intervals of 30 minutes. When surface tack is no longer noticed, freedom from tack has been attained.

The results are given in table 1.

Example 2

350 g of an α,ω-dihydroxypolydimethylsiloxane having a viscosity of 80,000 mPas, 200 g of an α,ω-trimethylsiloxy-polydimethylsiloxane having a viscosity of 1000 mPas, 22.0 g of 4-(triethoxysilylmethyl)tetrahydro-1,4-oxazine, 15 g of vinyltriethoxysilane, 10.0 g of 1,3,5-tris(3-trimethoxysilyl-propyl)isocyanurate, and 11.0 g of 3-glycidyloxypropylt-rimethoxysilane were mixed intimately with one another in a planetary dissolver for 15 minutes. Thereafter 36 g of hydrophilic fumed silica having a BET surface area of 150 $m^2/g$ were added (available commercially under the name HDK® V15 from Wacker Chemie AG, D-Munich) and 616 g of finely ground marble coated with stearic acid and having an average particle diameter (D50%) of about 5.0 μm (available commercially under the name "OMYABOND 520 FL" from OMYA, D-Cologne) mixing was continued for 20 minutes. The mixture was subsequently completed by addition of a mixture of 0.46 g of dioctyltin oxide in tetraisopropoxysilane (available under the name "TK217" from TIB Chemicals AG, D-Mannheim) and 3.0 g of a 50% strength by weight solution of octylphosphonic acid in methyltrimethoxysilane. For the degassing of the mixture, a subatmospheric pressure of approximately 200 hPa was applied and mixing was continued for 5 minutes. Thereafter the completed mixture was dispensed into standard commercial polyethylene cartridges. A composition was obtained which in accordance with ISO 7390 was sag-resistant—this means that the composition did not run from a vertically suspended, U-shaped aluminum profile.

Further procedure was as described in example 1. The results are given in table 1.

Example 3

350 g of an α,ω-dihydroxypolydimethylsiloxane having a viscosity of 80,000 mPas, 200 g of an α,ω-trimethylsiloxy-polydimethylsiloxane having a viscosity of 1000 mPas, 22.0 g of 4-(triethoxysilylmethyl)tetrahydro-1,4-oxazine, 15 g of vinyltriethoxysilane, and 11.0 g of 1,3,5-tris(3-trimethoxysi-lylpropyl)isocyanurate were mixed intimately with one another in a planetary dissolver for 15 minutes. Thereafter 45 g of hydrophilic fumed silica having a BET surface area of 150 $m^2/g$ were added (available commercially under the name HDK® V15 from Wacker Chemie AG, D-Munich) and 616 g of finely ground limestone coated with stearic acid and having an average particle diameter (D50%) of about 5.0 μm (available commercially under the name "OMYA BLR 3" from OMYA, D-Cologne) were added and mixing was continued for 20 minutes. The mixture was subsequently completed by addition of a mixture of 0.46 g of dioctyltin oxide in tetraisopropoxysilane (available under the name "TK217" from TIB Chemicals AG, D-Mannheim) and 3.0 g of a 50% strength by weight solution of octyl-phosphonic acid in methyltrimethoxysilane. For the degassing of the mixture, a subatmospheric pressure of approximately 200 hPa was applied and mixing was continued for 5 minutes. Thereafter the completed mixture was dispensed into standard commercial polyethylene cartridges. A composition was obtained which in accordance with ISO 7390 was sag-resistant—this means that the composition did not run from a vertically suspended, U-shaped aluminum profile.

Further procedure was as described in example 1. The results are given in table 1.

Comparative Example 1 in Accordance with U.S. Pat. No. 5,093,454

350 g of an α,ω-dihydroxypolydimethylsiloxane having a viscosity of 80,000 mPas, 200 g of an α,ω-trimethylsiloxy-polydimethylsiloxane having a viscosity of 1,000 mPas, 30.9 g of vinyltriethoxysilane, 10 g of 1,3,5-tris(3-trimethoxysilylpropyl)isocyanurate, and 11.0 g of 3-gly-cidyloxypropyltrimethoxysilane were mixed intimately with one another in a planetary dissolver for 15 minutes. Thereafter 36 g of hydrophilic fumed silica having a BET surface area of 150 $m^2/g$ were added (available commercially under the name HDK® V15 from Wacker Chemie AG, D-Munich) and mixing was continued for 15 minutes. The mixture was subsequently completed by addition of a mixture of 0.39 g of dioctyltin oxide in tetraisopropoxysilane (available under the name TK217 from TIB Chemicals AG, Mannheim) and 3.0 g of a 50% strength by weight solution of octylphos-phonic acid in methyltrimethoxysilane. For the degassing of the mixture, a subatmospheric pressure of approximately 200 hPa was applied and mixing was continued for 5 minutes. Thereafter the completed mixture was dispensed into standard commercial polyethylene cartridges. A compositon was obtained which in accordance with ISO 7390 was sag-resistant—this means that the composition did not run from a vertically suspended, U-shaped aluminum profile.

Samples of the product were stored at 23° C. for 24 hours in cartridges with airtight and moisturetight sealing before the properties were assessed. Further assessment of the product was impossible, since it had already cured and could no longer be extruded from the cartridges.

Comparative Example 2

350 g of an α,ω-dihydroxypolydimethylsiloxane having a viscosity of 80,000 mPas, 200 g of an α,ω-trimethylsiloxy-polydimethylsiloxane having a viscosity of 1000 mPas, 22.0 g of 4-(triethoxysilylmethyl)tetrahydro-1,4-oxazine, 15 g of vinyltriethoxysilane, and 11 g of a mixture of 1 part by weight of methyltrimethoxysilane hydrolysate oligomers having on average 10 Si atoms per molecule and 1 part by weight of 3-aminopropyltriethoxysilane (available under the name Haftvermittler AMS 70 from Wacker Chemie AG; adhesion promoter) were mixed intimately with one another in a planetary dissolver for 15 minutes. Thereafter 45 g of hydrophilic fumed silica having a BET surface area of 150 $m^2/g$ were added (available commercially under the name HDK® V15 from Wacker Chemie AG, D-Munich) 616 g of finely ground limestone coated with stearic acid and having an average particle diameter (D50%) of about 5.0 μm (available commercially under the name "OMYA BLR 3"

from OMYA, D-Cologne) and mixing was continued for 15 minutes. The mixture was subsequently completed by addition of a mixture of 0.46 g of dioctyltin oxide in tetraisopropoxysilane (available under the name TK217 from TIB run from a vertically suspended, U-shaped aluminum profile.

Further procedure was as described in example 1. The results are given in table 1.

| Example | Preliminary Storage | Skin forming time [min] | Tack-free state [h] | Hardness [ShA] | Tensile strength [MPa] | Modulus [MPa] | Elongation at break [%] |
|---|---|---|---|---|---|---|---|
| 1 | 24 h at 23° C. | 40 | 4 | 15 | 1.76 | 0.27 | 800 |
| 1 | 24 h at 23° C. + 7 d at 70° C. | 60 | 8 | 14 | 1.40 | 0.25 | 820 |
| 2 | 24 h at 23° C. | 15 | 2 | 19 | 1.42 | 0.30 | 930 |
| 2 | 24 h at 23° C. + 7 d at 70° C. | 90 | 8 | 20 | 1.06 | 0.36 | 730 |
| 3 | 24 h at 23° C. | 20 | 2 | 20 | 1.12 | 0.25 | 950 |
| 3 | 24 h at 23° C. + 7 d at 70° C. | 30 | 8 | 18 | 0.92 | 0.20 | 700 |
| C1 | 24 h at 23° C. | | | no values determinable | | | |
| C2 | 24 h at 23° C. | 60 | 24 | 25 | 1.36 | 0.40 | 940 |
| C2 | 24 h at 23° C. + 7 d at 70° C. | | | no values determinable | | | |
| C3 | 24 h at 23° C. | 25 | 24 | 22 | 1.91 | 0.34 | 1030 |
| C3 | 24 h at 23° C. 7 d at 70° C. | | | no values determinable | | | |

Chemicals AG, Mannheim) and 3.0 g of a 50% strength by weight of octylphosphonic acid in methyltrimethoxysilane. For the degassing of the mixture, a subatmospheric pressure of approximately 200 hPa was applied and mixing was continued for 5 minutes. Thereafter the completed mixture was dispensed into standard commercial polyethylene cartridges. A composition was obtained which in accordance with ISO 7390 was sag-resistant—this means that the composition did not run from a vertically suspended, U-shaped aluminum profile.

The characteristics of this mixture were determined in the same way as in example 1, and are compiled in table 1.

Comparative Example 3

350 g of an α,ω-dihydroxypolydimethylsiloxane having a viscosity of 80,000 mPas, 200 g of an α,ω-trimethylsiloxypolydimethylsiloxane having a viscosity of 1,000 mPas, 22.0 g of 4-(triethoxysilylmethyl)tetrahydro-1,4-oxazine, 15 g of vinyltriethoxysilane, and 11.0 g of 3-glycidyloxypropyltrimethoxysilane were mixed intimately with one another in a planetary dissolver for 15 minutes. Thereafter 37 g of hydrophilic fumed silica having a BET surface area of 150 m²/g were added (available commercially under the name HDK® V15 from Wacker Chemie AG, D-Munich) and 616 g of finely ground marble coated with stearic acid and having an average particle diameter (D50%) of about 5.0 µm (available commercially under the name "OMYABOND 520 FL" from OMYA, D-Cologne) was added and mixing was continued for 20 minutes. The mixture was subsequently completed by addition of a mixture of 0.46 g of dioctyltin oxide in tetraisopropoxysilane (available under the name "TK217" from TIB Chemicals AG, D-Mannheim) and 3.0 g of a 50% strength by weight solution of octylphosphonic acid in methyltrimethoxysilane. For the degassing of the mixture, a subatmospheric pressure of approximately 200 hPa was applied and mixing was continued for 5 minutes. Thereafter the completed mixture was dispensed into standard commercial polyethylene cartridges. A composition was obtained which in accordance with ISO 7390 was sag-resistant—this means that the composition did not

The invention claimed is:

1. A moisture curable composition which is storage stable in the absence of water, crosslinkable by condensation reaction, comprising:
    (A) at least one organosilicon compound having at least two condensable groups;
    (B) at least one organosilicon compound of the formula $$(R^3O)_{3-n}SiR^2{}_n\text{---}(CR^1{}_2)_m\text{---}NR^7\text{---}CO\text{---}R^8 \quad (I),$$

where
R$^1$ each is identical or different and is hydrogen or a monovalent, optionally substituted hydrocarbon radical,
R$^2$ each is identical or different and is a monovalent, optionally substituted hydrocarbon radical optionally interrupted by oxygen atoms,
R$^3$ each is identical or different and is hydrogen or a monovalent, optionally substituted hydrocarbon radical optionally interrupted by oxygen atoms,
R$^7$ each individually is hydrogen or a monovalent, optionally substituted hydrocarbon radical, which is optionally attached to nitrogen via a carbonyl group,
R$^8$ each individually is a monovalent, optionally substituted hydrocarbon radical, with the proviso that R$^7$ and R$^8$ are also optionally covalent bonds linking two organosilicon compounds (I) together at the nitrogen atom and at the carbon of the CO moiety to form a uretdione ring, or linking three organosilicon compounds (I) at the nitrogen atom and the carbon atom of the CO moiety to form an isocyanurate or iminooxadiazine ring,
m is an integer from 1 to 8, and
n is 0, 1 or 2,
and/or the partial hydrolysates thereof;
(C) at least one heterocyclic compound of the formula $$A[CR^4{}_2SiR^5{}_a(OR^6)_{3-a}]_x \quad (V),$$

where
A is a radical derived from a heterocycle AH$_x$ and comprises at least one ring-forming element selected from the group consisting of nitrogen, oxygen, and sulfur, in which x hydrogen atoms are replaced by chemical bonds to the $CR^4_2$ radical, at least one of these bonds being located on a nitrogen, sulfur, or oxygen ring-forming element, and wherein at least one ring-forming element is nitrogen, $R^4$ each is identical or different and is hydrogen or a monovalent, optionally substituted hydrocarbon radical, $R^5$ each is identical or different and is a monovalent, optionally substituted hydrocarbon radical optionally interrupted by oxygen atoms, $R^6$ each is identical or different and is hydrogen or a monovalent, optionally substituted hydrocarbon radical optionally interrupted by oxygen atoms, a is 0 or 1, and x is 1, 2 or 3, and/or the partial hydrolysates thereof, with the proviso that radical A does not comprise a ring carbon atom that has oxygen or sulfur atoms attached by a double bond and that has direct bonding to a ring-forming heteroatom of main group 3 or 5 which is bonded to a $CR^4_2$ radical of the formula (V), (D) optionally, epoxy-functional organosilicon compounds, and (E) optionally, calcium carbonate coated with stearic acid, and (F) optionally, one or more alkoxysilane crosslinkers, with the proviso that condensable alkoxy groups are present in the composition in at least one of components (A) and (F).

2. The crosslinkable composition of claim 1, wherein organosilicon compounds (A) comprise units of the formula

where

R each is identical or different and is an optionally substituted hydrocarbon radical optionally interrupted by oxygen atoms, b is 0, 1, 2 or 3, and c is 0, 1, 2 or 3, with the proviso that the sum of b+c≤3 and that per molecule there are at least two condensable radicals OH present.

3. The crosslinkable composition of claim 1, wherein organosilicon compounds (B) are prepared by dimerizing or trimerizing silyl-substituted isocyanates to form a uretdione, isocyanurate, or iminooxadiazine structures, and/or the partial hydrolysates thereof.

4. The crosslinkable composition of claim 2, wherein organosilicon compounds (B) are prepared by dimerizing or trimerizing silyl-substituted isocyanates to form a uretdione, isocyanurate, or iminooxadiazine structures, and/or the partial hydrolysates thereof.

5. The crosslinkable composition of claim 1, wherein organosilicon compounds (B) are silyl-substituted isocyanurates of the formula

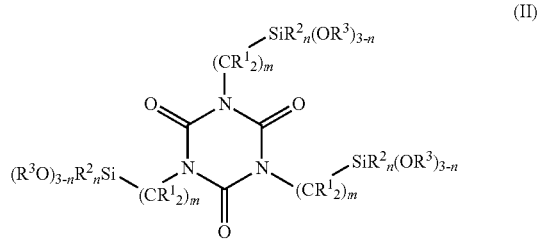

and/or the partial hydrolysates thereof, where $R^1$, $R^2$, $R^3$, n and m may each be identical or different.

6. The crosslinkable composition of claim 2, wherein organosilicon compounds (B) are silyl-substituted isocyanurates of the formula

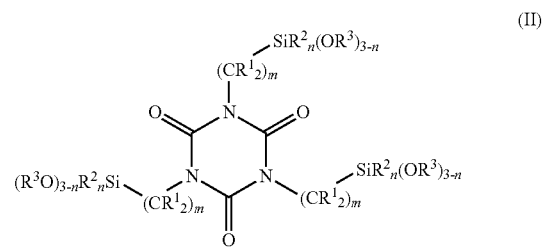

and/or the partial hydrolysates thereof, where $R^1$, $R^2$, $R^3$, n and m may each be identical or different.

7. The crosslinkable composition of claim 3, wherein organosilicon compounds (B) are silyl-substituted isocyanurates of the formula

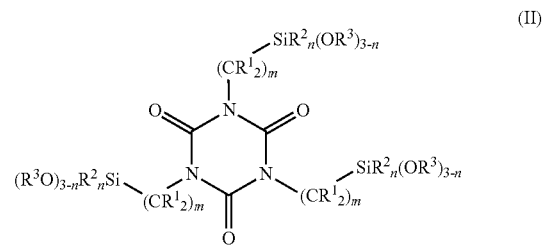

and/or the partial hydrolysates thereof, where $R^1$, $R^2$, $R^3$, n and m may each be identical or different.

8. The crosslinkable composition of claim 1, wherein epoxy-functional compounds (D) are present, and are compounds of the formulae

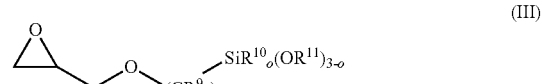

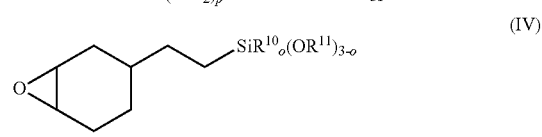

where o each is identical or different and is 0, 1 or 2, p is an integer from 1 to 8, $R^9$ each is identical or different and is hydrogen or a monovalent, optionally substituted hydrocarbon radical, $R^{10}$ each is identical or different and is a monovalent, optionally substituted hydrocarbon radical optionally interrupted by oxygen atoms, and $R^{11}$ each is identical or different and is hydrogen or a monovalent, optionally substituted hydrocarbon radical optionally interrupted by oxygen atoms.

9. The crosslinkable composition of claim 2, wherein epoxy-functional compounds (D) are present, and are compounds of the formulae

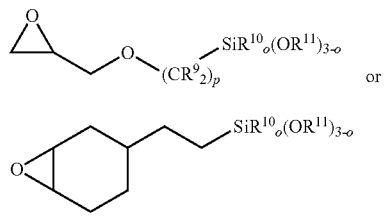

where o each is identical or different and is 0, 1 or 2, p is an integer from 1 to 8, $R^9$ each is identical or different and is hydrogen or a monovalent, optionally substituted hydrocarbon radical, $R^{10}$ each is identical or different and is a monovalent, optionally substituted hydrocarbon radical optionally interrupted by oxygen atoms, and $R^{11}$ each is identical or different and is hydrogen or a monovalent, optionally substituted hydrocarbon radical optionally interrupted by oxygen atoms.

10. The crosslinkable composition of claim 3, wherein epoxy-functional compounds (D) are present, and are compounds of the formulae

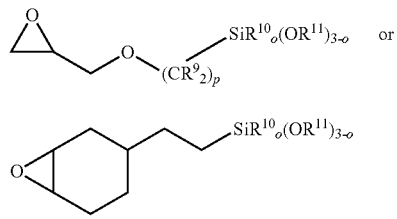

where o each is identical or different and is 0, 1 or 2, p is an integer from 1 to 8, $R^9$ each is identical or different and is hydrogen or a monovalent, optionally substituted hydrocarbon radical, $R^{10}$ each is identical or different and is a monovalent, optionally substituted hydrocarbon radical optionally interrupted by oxygen atoms, and $R^{11}$ each is identical or different and is hydrogen or a monovalent, optionally substituted hydrocarbon radical optionally interrupted by oxygen atoms.

11. The crosslinkable composition of claim 5, wherein epoxy-functional compounds (D) are present, and are compounds of the formulae

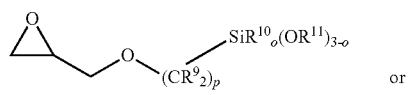

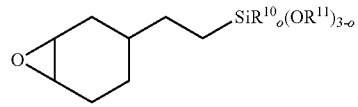

where o each is identical or different and is 0, 1 or 2, p is an integer from 1 to 8, $R^9$ each is identical or different and is hydrogen or a monovalent, optionally substituted hydrocarbon radical, $R^{10}$ each is identical or different and is a monovalent, optionally substituted hydrocarbon radical optionally interrupted by oxygen atoms, and $R^{11}$ each is identical or different and is hydrogen or a monovalent, optionally substituted hydrocarbon radical optionally interrupted by oxygen atoms.

12. The crosslinkable composition of claim 1, wherein the composition is crosslinkable through condensation reaction with atmospheric moisture and comprises:

(A) at least one organosilicon compound having at least two condensable groups, (B) at least one organosilicon compound of the formula (I) and/or the partial hydrolysates thereof, (C) at least one heterocyclic compound of the formula (V), and/or the partial hydrolysates thereof, (D) optionally, epoxy-functional organosilicon compounds, (E) optionally, calcium carbonate coated with stearic acid, (F) optionally, further crosslinkers, (G) optionally, catalysts, (H) optionally, further fillers, (I) optionally, further adhesion promoters, (K) optionally, plasticizers, and (L) optionally, additives other than (D) through (K).

13. The crosslinkable composition of claim 1, wherein component (D) is present.

14. The crosslinkable composition of claim 1, wherein component (E) is present.

15. A process for preparing the composition of claim 1, comprising mixing all of the constituents with one another with the exclusion of water.

16. A shaped article produced by crosslinking a composition of claim 1.

17. The crosslinkable composition of claim 1, wherein the organosilicon compound (B) comprises at least one of N-1-(triethoxysilyl)-ethylpyrrolid-2-one, N-1-(triethoxysilyl)ethyl-N-methylacetamide, N-1-(triethoxysilyl)ethylsuccinimide, N-1-(triethoxysilyl)ethylphthalimide, N,N'-bis(3-(trimethoxysilyl)propyl)uretdione, 1,3,5-tris (3-trimethoxysilylpropyl)isocyanurate, 1,3,5-tris (3-(triethoxysilylpropyl)isocyanurate, N,N',N"-tris(3-(trimethoxysilyl)propyl)-2-imino-3H,5H-1,3,5-oxadiazine-4,6-dione, 1,3,5-tris [3-(trimethoxy-silyl)propyl]-1H,3H,5H-1,3,5-triazine-2,4,6-trione, 1,3,5-tris [3-(triethoxysilyl)propyl]-1H,3H,5H-1,3,5-triazine-2,4,6-trione, 1,3,5-tris [trimethoxysilylmethyl]-1H,3H,5H-1,3,5-triazine-2,4,6-trione, 1,3,5-tris-[triethoxysilylmethyl]-1H,3H,5H-1,3,5-triazine-2,4,6-trione, 1,3,5-tris [3-(dimethoxymethylsilyl)propyl]-1H,3H,5H-1,3,5-triazine-2,4,6-trione, or 1,3,5-tris [3-(diethoxymethylsilyl)propyl]-1H,3H,5H-1,3,5-triazine-2,4,6-trione.

18. The crosslinkable composition of claim 1, wherein heterocyclic compound (C) comprises at least one of 1-(triethoxysilylmethyl)pyrrolidine, 1-(triethoxysilyl-methyl)piperidine, 4-(triethoxysilylmethyl)tetrahydro-1,4-oxazine, 1-(triethoxysilylmethyl)tetrahydro-1,4-diazine-3-one, 1-(trimethoxysilylmethyl)pyrrolidine, 1-(trimethoxysilylmethyl)piperidine, 4-(trimethoxysilyl-methyl)tetrahydro-1,4-oxazine, 1-(diethoxymethylsilyl-methyl)pyrrolidine, 1-(diethoxymethylsilylmethyl)-piperidine, 4-(diethoxymethylsilylmethyl)tetrahydro-1,4-oxazine, 1-(diethoxymethylsilylmethyl)pyrrolidine, 1-(dimethoxymethylsilylmethyl)piperidine, and 4-(dimethoxymethylsilylmethyl)tetrahydro-1,4-oxazine or any of the compounds above wherein triemethoxysilyl and/or triethoxysilyl radicals are replaced with diethoxymethoxysilyl or ethoxydimethoxysilyl radicals, and diethoxymethyl-silyl and/or dimethoxymethylsilyl radicals are replaced by ethoxymethoxymethylsilyl radicals.

19. The crosslinkable composition of claim 1, wherein heterocyclic compound (C) comprises 4-(triethoxysilylmethyl)tetrahydro-1,4-oxazine.

20. The composition of claim 1, which contains reinforcing pyrogenic silica in an amount of from 1 to 80 parts by weight based on 100 parts of the composition.

21. The composition of claim 1, wherein component (E) is present in an amount of from 30 to 60 parts by weight relative to 100 parts of the composition.

* * * * *